US011367921B2

(12) United States Patent
Hur et al.

(10) Patent No.: US 11,367,921 B2
(45) Date of Patent: Jun. 21, 2022

(54) ELECTRONIC DEVICE INCLUDING BATTERY

(71) Applicant: Samsung Electronics Co., Ltd., Gyeonggi-do (KR)

(72) Inventors: June Young Hur, Gyeonggi-do (KR); Shi Hyun Kim, Gyeonggi-do (KR); Young Ho Seo, Gyeonggi-do (KR); Si Hoon Youm, Gyeonggi-do (KR); Soon Wan Chung, Gyeonggi-do (KR)

(73) Assignee: Samsung Electronics Co., Ltd ( * ) Notice: Subject to any disclaimer, the term of this patent is extended or adjusted under 35 U.S.C. 154(b) by 73 days.

(21) Appl. No.: 16/470,900

(22) PCT Filed: Dec. 21, 2017

(86) PCT No.: PCT/KR2017/015192
§ 371 (c)(1),
(2) Date: Jun. 18, 2019

(87) PCT Pub. No.: WO2018/117664
PCT Pub. Date: Jun. 28, 2018

(65) Prior Publication Data
US 2019/0326567 A1    Oct. 24, 2019

(30) Foreign Application Priority Data

Dec. 23, 2016    (KR) .................. 10-2016-0178558

(51) Int. Cl.
H01M 50/20    (2021.01)
H04M 1/02    (2006.01)
H01M 50/209    (2021.01)

(52) U.S. Cl.
CPC ...... *H01M 50/209* (2021.01); *H01M 2220/30* (2013.01); *H04M 1/0262* (2013.01)

(58) Field of Classification Search
CPC ...... H01M 2/10; H01M 2220/30; H01M 2/14; H01M 2/02; H01M 2/1016; H01M 2/1235;
(Continued)

(56) References Cited

U.S. PATENT DOCUMENTS 8,637,173 B2    1/2014 Koh
8,808,895 B2    8/2014 Malek et al.
(Continued)

FOREIGN PATENT DOCUMENTS

JP    2002334686    11/2002
KR    1020120055018    5/2012
(Continued)

OTHER PUBLICATIONS

Naher et al, "Effect of micro-channel geometry on fluid flow and mixing", 2011, Elsevier BV, obtained from https://core.ac.uk/display/30934460 (Year: 2011).*

(Continued)

*Primary Examiner* — Allison Bourke
*Assistant Examiner* — Charlene Bermudez
(74) *Attorney, Agent, or Firm* — The Farrell Law Firm, P.C.

(57) ABSTRACT

Disclosed is an electronic device according to an embodiment of the disclosure that includes a battery and a battery mounting part that receives the battery therein, in which the battery mounting part includes a base and at least one side surface extending from an edge of the base and a recess area is formed in at least a partial area of the at least one side surface. Besides, it may be permissible to prepare various other embodiments speculated through the specification.

6 Claims, 21 Drawing Sheets

(58) Field of Classification Search
CPC ........ H01M 2/36; H01M 2/06; H01M 10/052;
H01M 10/425; H01M 10/625; H01M
8/026; H01M 8/247; H01M 2220/20;
H01M 2/0202; H01M 12/00; H01M
2002/0205; H01M 50/166; H05K 1/0271;
B32B 3/30; B32B 27/08; B32B 5/18;
B32B 7/12; B32B 15/08; B29C 45/14008
See application file for complete search history.

(56)  References Cited

U.S. PATENT DOCUMENTS

| | | |
|---|---|---|
| 9,356,267 B1 | 5/2016 | To et al. |
| 2012/0214023 A1* | 8/2012 | Koh .................... H01M 10/425 |
| | | 429/7 |
| 2013/0344352 A1 | 12/2013 | Malek et al. |
| 2015/0194648 A1* | 7/2015 | Fathollahi ......... H04M 1/72409 |
| | | 429/98 |
| 2016/0043763 A1 | 2/2016 | Richter |
| 2016/0093846 A1 | 3/2016 | Malinski et al. |
| 2016/0181580 A1 | 6/2016 | To et al. |

FOREIGN PATENT DOCUMENTS

| | | |
|---|---|---|
| KR | 101274903 | 6/2013 |
| KR | 1020130138974 | 12/2013 |

OTHER PUBLICATIONS

PCT/ISA/210 Search Report issued on PCT/KR2017/015192, pp. 5.
PCT/ISA/237 Written Opinion issued on PCT/KR2017/015192, pp. 5.

* cited by examiner

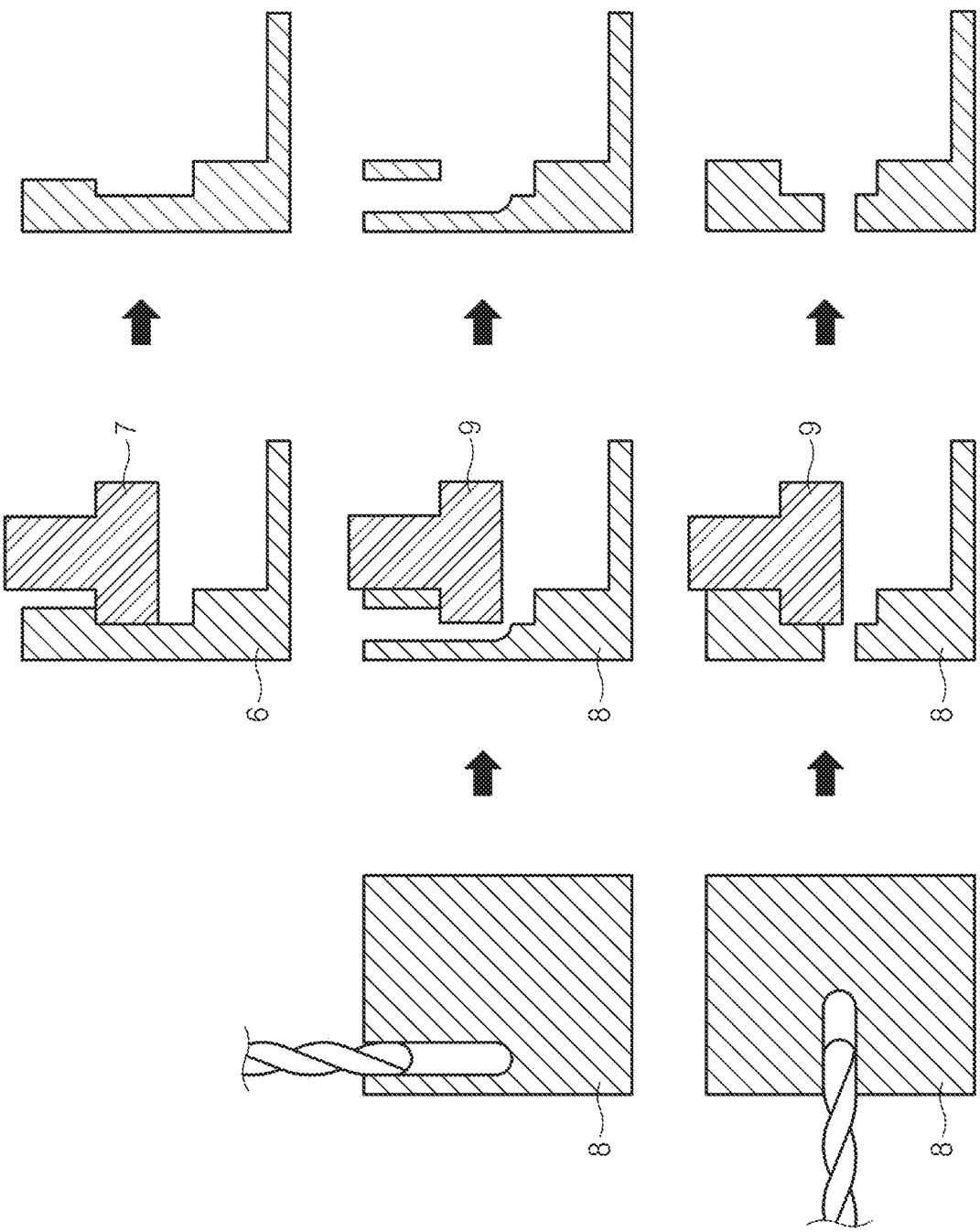

ELECTRONIC DEVICE INCLUDING BATTERY

PRIORITY

This application is a National Phase Entry of PCT International Application No. PCT/KR2017/015192 which was filed on Dec. 21, 2017, and claims priority to Korean Patent Application No. 10-2016-0178558, which was filed on Dec. 23, 2016, the content of each of which is incorporated herein by reference.

TECHNICAL FIELD

Various embodiments of the disclosure described herein relate to a battery mounting structure in an electronic device.

BACKGROUND ART

Recently proposed electronic devices have been aimed at increasing convenience of operation or achieving an aesthetic improvement and have become increasingly smaller in size and lighter in weight. Correspondingly, components of the electronic devices have overcome a limitation of space in the electronic devices, based on an improvement in software or hardware. For instance, a recent electronic device has an embedded battery that enables implementation of minimalism design. The embedded battery may be mounted in a battery mounting part that is provided as a physical fixing means in the electronic device.

DISCLOSURE

Technical Problem

In a manufacturing process of the embedded battery, a dimensional tolerance may occur in an internal electrode body, or an assembly tolerance may occur between the electrode body and an exterior material (e.g., a pouch). In view of the tolerance, a volume of a critical size that reflects the tolerance may be applied to the embedded battery when mounting of the embedded battery in the battery mounting part is designed Therefore, a spacing space may be formed between the embedded battery and the battery mounting part, and when an external impact is applied, the spacing space may cause a movement of the embedded battery, which may lead to physical and chemical damage.

Various embodiments of the disclosure may provide a battery mounting structure for suppressing a movement of a battery due to an external impact and preventing damage to the battery, based on a structural improvement achieved by adding a specified buffer member to the battery mounting structure, and may provide an electronic device including the battery mounting structure.

Technical Solution

An electronic device according to an embodiment includes a battery and a battery mounting part that receives the battery therein. The battery mounting part includes a base and at least one side surface extending from an edge of the base, and a recess area is formed in at least a partial area of the at least one side surface.

Advantageous Effects

According to various embodiments, a specified buffer member may lessen a spacing space between a battery and a battery mounting part that supports physically fixing the battery, thereby suppressing a movement of the battery and preventing damage to the battery due to the movement.

According to various embodiments, accidents such as electrolyte leakage, electric leakage, ignition, explosion, or the like may be prevented by the prevention of damage to the battery.

In addition, the disclosure may provide various effects that are directly or indirectly recognized.

DESCRIPTION OF DRAWINGS

FIG. 6B is a view illustrating a manufacturing process of the battery mounting part according to another embodiment.

MODE FOR INVENTION

Figure 1:
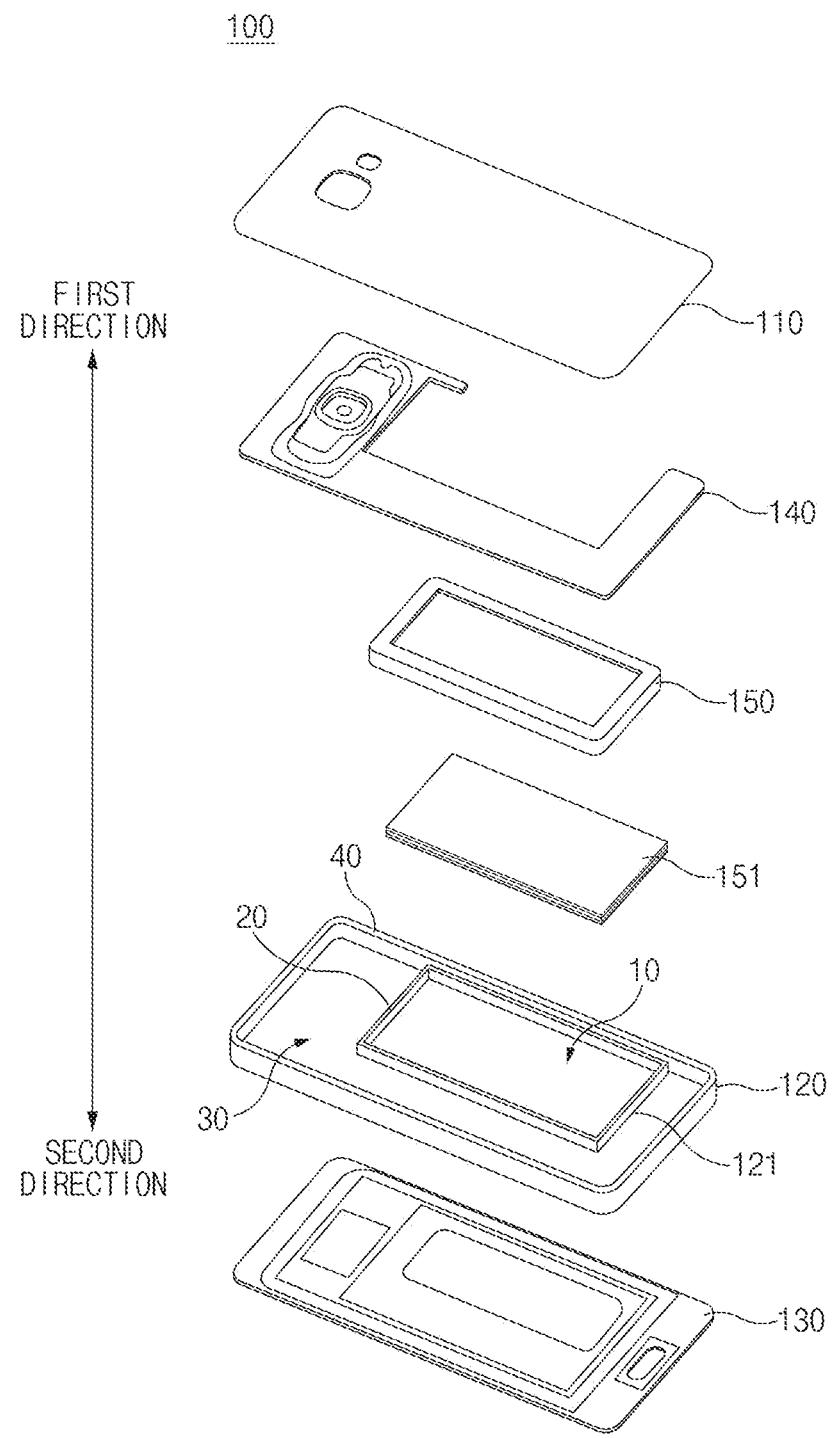
FIG. 1 is an exploded view of an electronic device according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

The expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different user devices regardless of order or importance. For example, a first component may be referred to as a second component and vice versa without departing from the scope of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings.

The term "user" used herein may refer to a person who uses an electronic device or may refer to a device (e.g., an artificial intelligence electronic device) that uses an electronic device.

FIG. 1 is an exploded view of an electronic device according to an embodiment.

Referring to FIG. 1, an electronic device 100 may include a first case 110 (e.g., a rear case), a second case 120 (e.g., a front case), a display 130, a printed circuit board 140, and a battery 150. In various embodiments, the electronic device 100 may exclude at least one of the aforementioned components, or may further include other component(s). For example, the electronic device 100 may further include at least one system resource (e.g., a communication module, a memory, a processor, and/or the like) that supports operating functions of the electronic device 100, in addition to the aforementioned components.

In an embodiment, the battery 150 may be disposed in a battery mounting part 121 provided on at least a partial area of the second case 120. For example, the battery 150 may be mounted on a first surface 10 (e.g., a base) of the battery mounting part 121, based on an adhesive member 151 that is formed to have the same area as, or an area corresponding to, that of the battery 150 and that supports fixing the battery 150 to the battery mounting part 121. The adhesive member 151 may include, for example, a first adhesive layer attached to a lower surface of the battery 150 that faces a second direction, a second adhesive layer attached to the first surface 10 of the battery mounting part 121, and a base layer disposed between the first adhesive layer and the second adhesive layer.

As mentioned above, a volume reflecting a manufacturing tolerance may be applied to the battery 150 when a mounting for the battery 150 is designed, and therefore a spacing space (or, a gap) may be formed in at least a partial area between the battery 150 and the battery mounting part 121. In this regard, when an external impact is applied to the electronic device 100 or the battery 150, the mounted battery 150 may move through the spacing space and may collide with at least one of the first surface 10 or a second surface 20 (e.g., a side surface) of the battery mounting part 121. According to an embodiment of the disclosure, the spacing space may be filled with a buffer member (or, a gap-filler) that has a viscosity property of a specified range (or, magnitude), and the buffer member may help firmly fix the battery 150 and alleviate the external impact. Hereinafter, various embodiments of a mounting structure for the battery 150 in relation to the buffer member will be described.

The first case 110 and the second case 120 may be combined together to form a housing that receives components of the electronic device 100 therein. In this regard, at least one protruding member may be provided on at least a partial area (e.g., an edge) of any one of the first case 110 and the second case 120, and at least one receiving member corresponding to the protruding member may be provided on at least a partial area (e.g., an edge) of the other case. For example, the protruding member may be fit into the receiving member by external pressure, and thus the first case 110 and the second case 120 may be integrally combined with each other.

The battery mounting part 121 for receiving the battery 150 therein may be included in at least a partial area of the second case 120. For example, the battery mount part 121 may be formed through a separate process and then coupled or attached to the second case 120, or may be formed as at least a portion of the second case 120 in a manufacturing process (e.g., injection molding) of the second case 120. The battery mounting part 121 may include the first surface 10 (e.g., a base or an attachment surface) and at least one second surface 20 (e.g., a side surface or a support surface) that extends from an edge of the first surface 10 while forming a specified angle (e.g., about 90 degrees or about 45 degrees) or curvature. In an embodiment, the second surface 20 of the battery mounting part 121 may extend from the first surface 10 to a height that is the same as, or similar to, the thickness of the battery 150 (e.g., 50% to 80% of the thickness of the battery 150). Alternatively, the second surface 20 of the battery mounting part 121 may have the same height as, or a height similar to, the height of a second surface 40 (e.g., a side surface) that extends from a first surface 30 (e.g., a base) of the second case 120 in a first direction, or may have a smaller height than the second surface 40 in the first direction.

The display 130 may be disposed on a lower surface area of the second case 120 that faces the second direction. For example, one area of the display 130 may be inserted into an inner space formed by the first surface 30 of the second case 120 and the second surface 40 extending from the first surface 30 in the second direction, and the remaining area of the display 130 may be exposed to the outside to finish the inner space. In an embodiment, the display 130 may include at least one of a display panel, a cover glass, or a touch panel (or, a touch sensor). The display panel may output at least one piece of content (e.g., text, an image, a video, an icon, a widget, a symbol, or the like) in response to a user input or according to specified scheduling information. The cover glass may be disposed over the display panel and may transmit light generated by the display panel. A user input by a user's body or an electronic pen may be applied to at least a partial area of the cover glass. The touch panel may detect a signal according to the user input, based on, for example, a capacitive, resistive, infrared, or ultrasonic detecting method and may output the signal as an electrical signal.

The printed circuit board 140 may include at least one electronic part associated with operating a function of the electronic device 100. For example, a memory, a processor, an antenna module, a speaker module, or circuitry related to the electronic parts may be mounted on the printed circuit board 140. In an embodiment, so as not to overlap at least a partial area of the battery 150 mounted in battery mounting part 121, the printed circuit board 140 may be formed in a structure that avoids the mounting area of the battery 150. Furthermore, a plurality of printed circuit boards 140 may be provided, and at least some of the plurality of printed circuit boards may be stacked one above another and electrically connected together.

The battery 150 may supply power to components of the electronic device 100. For example, the battery 150 may be electrically connected with the printed circuit board 140 in the state of being mounted in the battery mounting part 121 and may supply power to the components of the electronic device 100 or the electronic parts mounted on the printed circuit board 140, based on the electrical connection with the printed circuit board 140. In an embodiment, the battery 150 may include an exterior material (e.g., a pouch based on an aluminum laminate sheet) and an electrode assembly (e.g., a jelly roll) that is received in the exterior material. Furthermore, the battery 150 may include a lithium ion battery or a lithium ion polymer battery.

Figure 2:
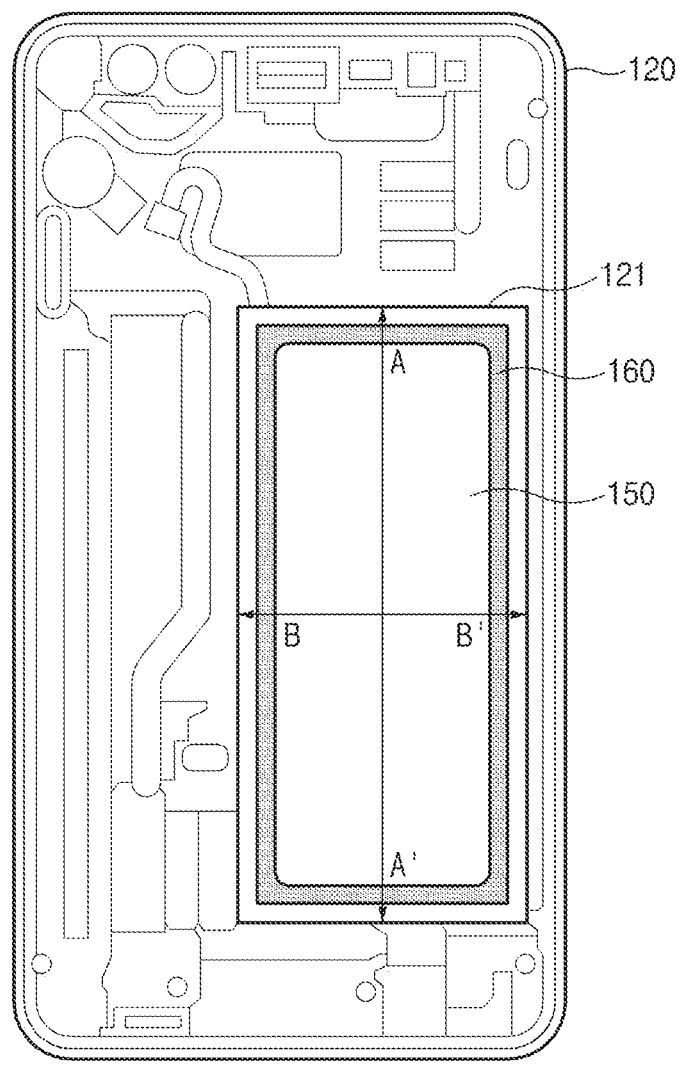
FIG. 2 is a view illustrating a mounting form of a battery according to an embodiment.

FIG. 2 is a view illustrating a mounting form of the battery according to an embodiment.

Referring to FIG. 2, the battery 150 may be mounted in the battery mounting part 121 provided on at least a partial area of the second case 120. In this mounting structure, a spacing space may be formed in at least a partial area between the battery 150 and the battery mounting part 121 according to the volume of the battery 150.

In an embodiment, a buffer member 160 that is injected and cured based on a specified process may be contained in the spacing space. For example, the buffer member 160 may be injected to a specified height from the first surface (10 of FIG. 1) of the battery mounting part 121 to fill at least a portion of the spacing space. In an embodiment, the buffer member 160 may be cured according to a specified condition (e.g., UV irradiation, room-temperature drying, or the like) to fix the position of the mounted battery 150 or suppress a movement thereof. Alternatively, the buffer member 160 may exhibit elastic characteristics after cured and may absorb an external impact applied to the battery 150. In an embodiment, the buffer member 160 may be implemented with a chemical material that has a lower hardness than the battery mounting part 121 and has a specified viscosity property. For example, the buffer member 160 may be implemented with a first material (e.g., synthetic rubber or the like) that has a viscosity of tens to thousands of units, or may be implemented with a second material (e.g., urethane acrylic, silicone, or the like) that has a viscosity of tens of thousands of units or more. In various embodiments, the buffer member 160 may be implemented by mixing the first material and the second material at a specified ratio. Alternatively, the buffer member 160 made of the second material may be contained in a portion of the spacing space that is required to provide a high level of protection of the battery 150 against an impact or corresponds to an area relatively vulnerable to an external impact, and the buffer member 160 made of the first material or the second material may be selectively contained in the remaining spacing space.

Figure 3A:
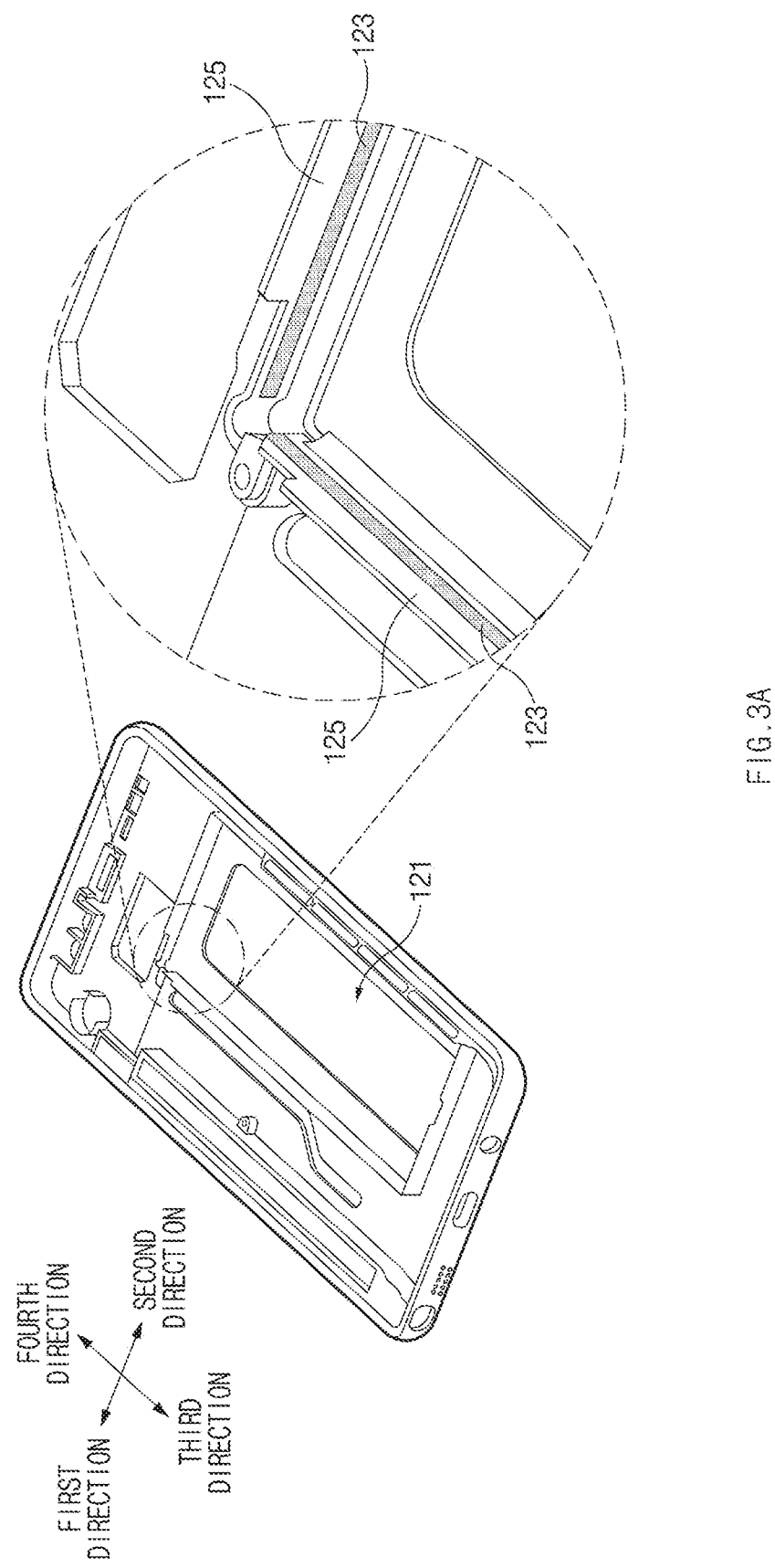
FIG. 3A is a view illustrating a battery mounting part according to an embodiment.
Figure 3B:
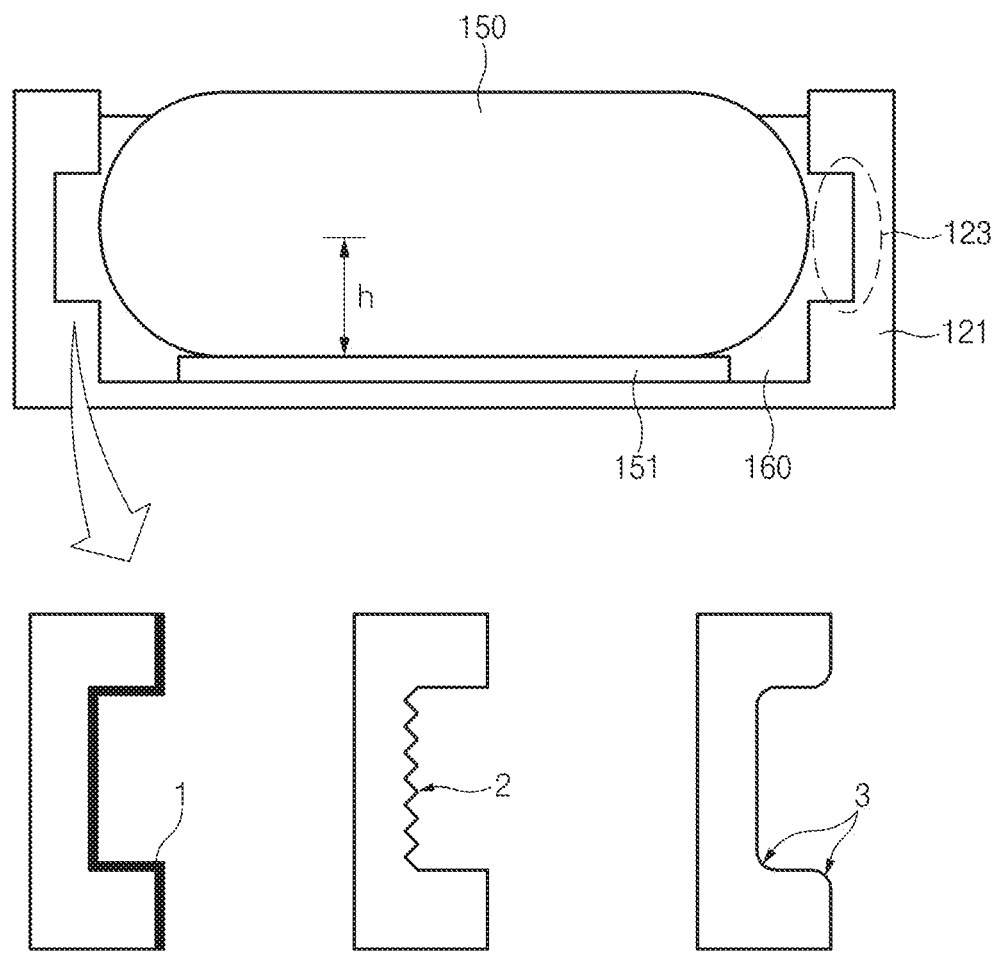
FIG. 3B is a sectional view of a battery mounting structure according to an embodiment that is taken in one direction.

FIG. 3A is a view illustrating the battery mounting part according to an embodiment, and FIG. 3B is a sectional view of a battery mounting structure according to an embodiment that is taken in one direction (e.g., the direction B-B' of FIG. 2). Matters to be described with reference to FIG. 3B are not limited to the one direction (e.g., the direction B-B') and may be identically or similarly applied to another direction (e.g., the direction A-A' of FIG. 2) of the battery mounting structure.

Referring to FIG. 3A, at least a portion of the at least one second surface (20 of FIG. 1) of the battery mounting part 121 may include a recess area 123 in a specified shape. For example, the battery mounting part 121 may include the recess area 123 that is concavely formed to a specified depth and width from the inner side of the second surface 20 to the outer side thereof. The recess area 123 may at least partially expand the spacing space between the battery mounting part 121 and the battery (150 of FIG. 1) that is mounted in the battery mounting part 121, and when the buffer member (160 of FIG. 2) is injected into the spacing space, the recess area 123 may function as a flow passage of the buffer member 160. In this regard, the recess area 123 may be formed in a shape having a specified inclination. In this case, the recess area 123 may not only support the flow of the buffer member 160, but may also prevent occurrence of an air pocket in the injected buffer member 160 by suppressing air inclusion when the buffer member 160 is injected.

Furthermore, the recess area 123 may increase a contact surface of the buffer member 160 (e.g., a cured buffer member) to improve absorption (or, alleviation) efficiency of the buffer member 160 against an external impact applied to the mounted battery 150. Alternatively, the recess area 123 may increase an attachment force of the buffer member 160 (e.g., a cured buffer member) on the battery mounting part 121 to support firmly fixing the battery 150.

In an embodiment, the recess area 123 formed on any one of the at least one second surface 20 of the battery mounting part 121 may extend in the lengthwise direction of the corresponding second surface 20 and may be connected with a recess area 123 formed on adjacent another second surface 20. Alternatively, in another embodiment, the recess area 123 formed on any one of the at least one second surface 20 may extend in the lengthwise direction, with a point before a distal end in the lengthwise direction of the corresponding second surface 20 as a starting point or an ending point. Accordingly, the at least one second surface 20 may each include the individual recess area 123.

In an embodiment, the recess area 123 may function as a flow passage for the buffer member 160 that is injected in a slurry state. In this regard, at least a portion of the recess area 123 may be connected with an injection passage (or, hole) of the buffer member 160 that is formed in at least a partial area of the battery mounting part 121. The buffer member 160 injected through the injection passage may be introduced into the recess area 123 connected with the injection passage, based on the force of gravity or pressure exerted by an injection apparatus and may flow in at least a partial area of the recess area 123 for a predetermined period of time. As the predetermined period of time passes or according to the amount of the buffer member 160 injected, the buffer member 160 flowing in the recess area 123 may flow onto the first surface (10 of FIG. 1) of the battery mounting part 121 and may fill the spacing space between the battery mounting part 121 and the battery 150.

In an embodiment, in regard to the at least one second surface 20 extending from the first surface (10 of FIG. 1) to a height similar to the thickness of the battery 150 (e.g., 50% to 80% of the thickness of the battery 150), the battery mounting part 121 may include at least one guide surface 125 that functions to compensate for the height of the second surface 20. For example, the guide surface 125 may be coupled or attached to an upper end area of the second surface 20 of the battery mounting part 121, or may be formed as a portion of the second surface 20 in a manufacturing process of the battery mounting part 121. In an embodiment, the guide surface 125 disposed on the at least one second surface 20 may have different heights depending on directions (e.g., the first to fourth directions) based on the mounted battery 150. For example, the guide surface 125 disposed on the second surface 20 that corresponds to the first direction and the second direction may be formed such that the total height including the corresponding second surface 20 corresponds to a first percentage (e.g., 75%) or more of the thickness of the battery 150. Furthermore, the guide surface 125 according to the third direction may be formed such that the height including the corresponding second surface 20 corresponds to a second percentage (e.g., 80%) or more of the thickness of the battery 150. The guide surface 125 according to the fourth direction may be formed such that the height including the corresponding second surface 20 is the same as the thickness of the battery 150.

Referring to FIG. 3B, in the mounting structure of the battery 150 mounted on (or, attached to) the battery mounting part 121 based on the adhesive member 151, the recess area 123 formed on the second surface (20 of FIG. 1) of the battery mounting part 121 may correspond to the height h of the center of the mounted battery 150. In this case, the mounted battery 150 may be fixed to be balanced, and a narrow filling space for the buffer member 160 may be compensated for according to the external appearance (e.g., a shape having a curved area) of the battery 150. Alternatively, the recess area 123 on the second surface 20 of the battery mounting part 121 may be formed in a lower position than the height h of the center of the battery 150. In this regard, the buffer member 160 flowing onto the first surface (10 of FIG. 1) of the battery mounting part 121 through the recess area 123 in the lower position may densely flow into the area of the first surface 10 and may prevent occurrence of an air pocket. In another case, the recess area 123 on the second surface 20 of the battery mounting part 121 may be formed in a higher position than the height h of the center of the battery 150, and the amount of the buffer member 160 exposed or adjacent to the outside may be increased, which may result in an improvement in curing efficiency.

In an embodiment, in regard to an improvement in fluidity of the buffer member 160, the recess area 123 may be improved through at least one process. For example, at least one of a mirror-like finishing process based on lapping, grinding, or polishing for at least one area (e.g., reference numeral 1), a synthetic resin (e.g., Teflon) coating process for the at least one area (e.g., reference numeral 1), a hairline forming process for at least one other area (e.g., reference numeral 2), or an edge profiling process for at least one other area (e.g., reference numeral 3) may be applied to the recess area 123.

Figure 4A:
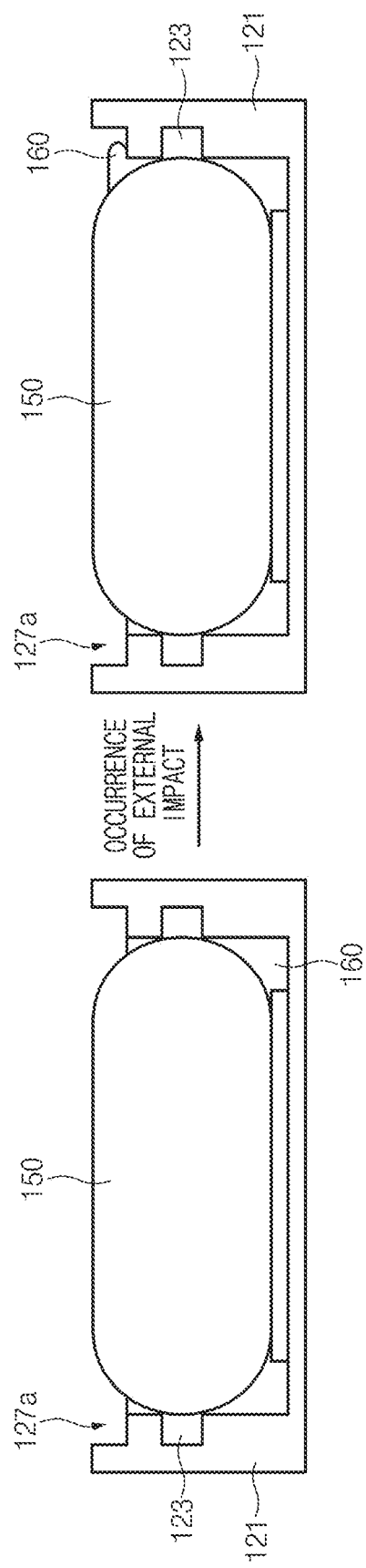
FIG. 4A is a sectional view of a battery mounting structure according to another embodiment that is taken in one direction.
Figure 4B:
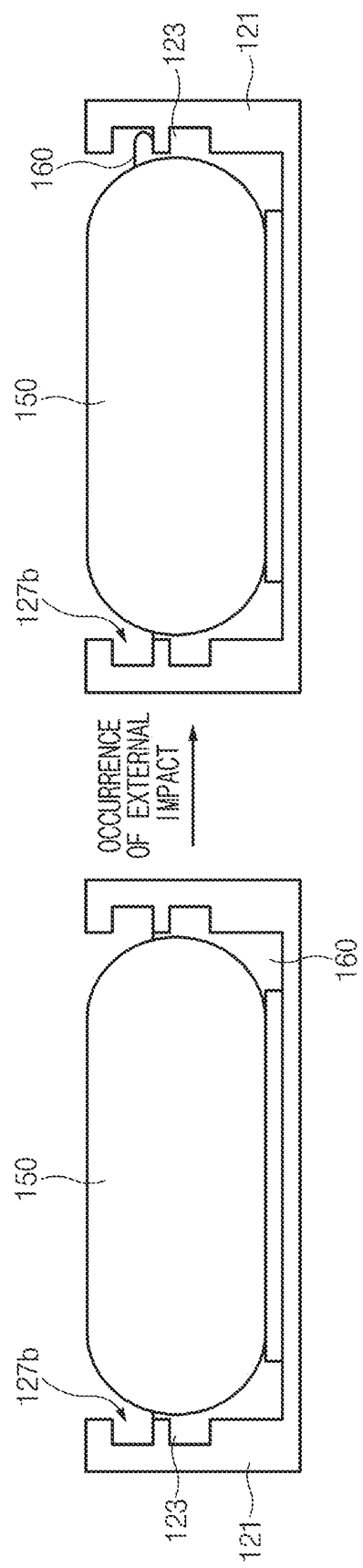
FIG. 4B is a sectional view of a battery mounting structure according to another embodiment that is taken in one direction.

FIGS. 4A and 4B are sectional views of battery mounting structures according to various embodiments that are taken in one direction (e.g., the direction B-B' of FIG. 2). Matters to be described with reference to FIGS. 4A and 4B are not limited to the one direction and may be identically or similarly applied to another direction (e.g., the direction A-A' of FIG. 2) of the battery mounting structures.

Referring to FIGS. 4A and 4B, in an embodiment, the battery mounting part 121 may further include a sub-recess area 127a or 127b (or, another recess area), in addition to the above-described recess area 123. In this regard, for example, an external impact greater than the elastic strength of the buffer member 160 may be applied to the mounted battery 150. In this case, the battery 150 may be moved, and the movement of the battery 150 may apply pressure to at least one area of the injected buffer member 160. The pressure may cause deformation of the at least one area of the buffer member 160, which may result in the buffer member 160 escaping out of the battery mounting part 121. In another example, at least a portion of the buffer member 160 may escape out of the battery mounting part 121 due to a temperature change inside/outside the electronic device 100 or a physical force (e.g., a drop impact or the like) that is applied to the electronic device 100 from the outside. In another example, a specified amount of injection may be exceeded in an injection process of the buffer member 160, and therefore the buffer member 160 may flow (e.g., overflow) outside the battery mounting part 121. Alternatively, the injected buffer member 160 may flow out (e.g., overflow) due to a dimensional deviation of the battery mounting part 121. In the exemplified environments, the sub-recess area 127a or 127b may prevent the buffer member 160 from escaping or flowing to the outside in accordance with sudden (e.g., the deformation of the buffer member 160, the temperature change of the electronic device 100, the drop impact of the electronic device 100, the excessive amount of the buffer member 160 injected, or the like). For example, the sub-recess area 127a or 127b may temporarily or permanently receive at least a portion of the buffer member 160 in accordance with the sudden to prevent the buffer member 160 from escaping or flowing out of the battery mounting part 121. According to an embodiment, the buffer member 160 may be injected into the battery mounting part 121, which includes the recess area 123 and the sub-recess area 127a or 127, to a height or an amount of injection that does not reach the sub-recess area 127a or 127b.

Figure 5A:
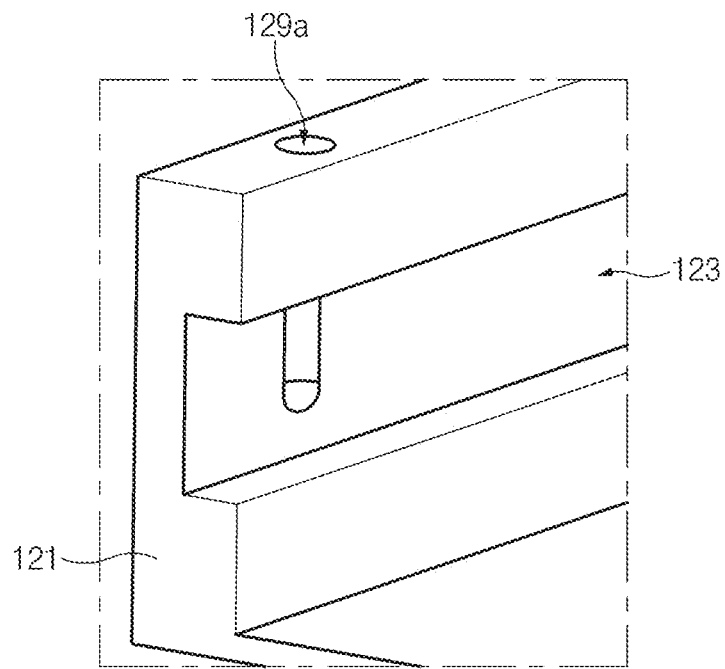
FIG. 5A is a view illustrating an injection passage of a buffer member according to an embodiment.
Figure 5A:
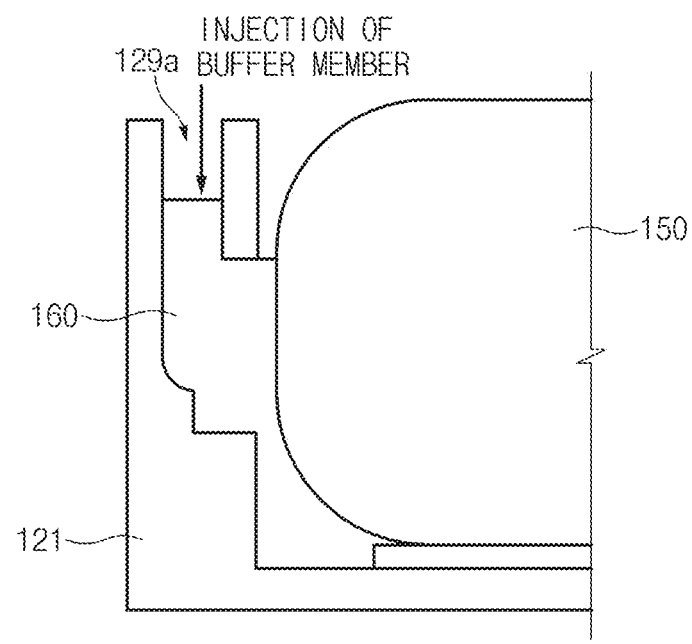
Figure 5B:
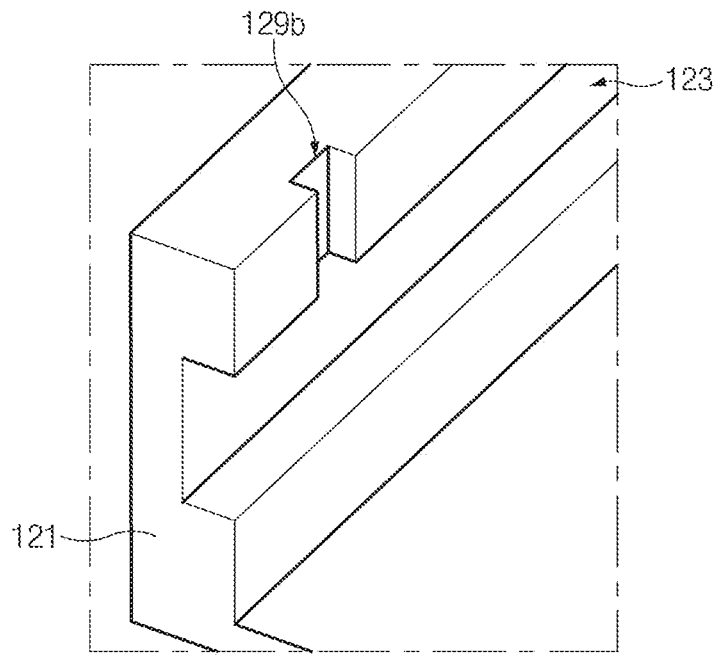
FIG. 5B is a view illustrating an injection passage of a buffer member according to another embodiment.
Figure 5B:
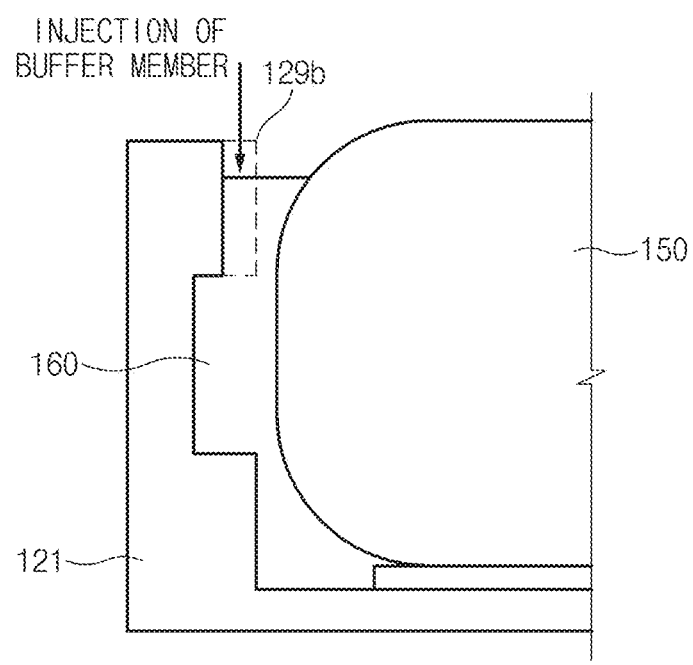
Figure 5C:
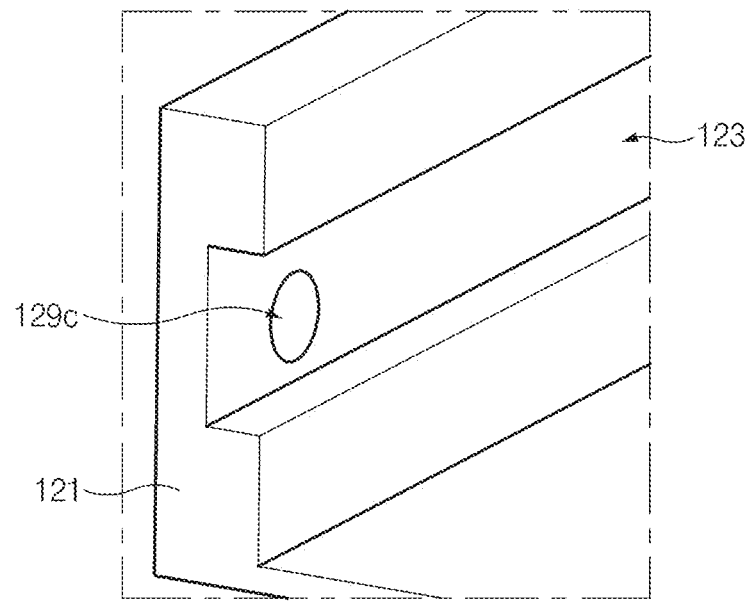
FIG. 5C is a view illustrating an injection passage of a buffer member according to another embodiment.
Figure 5C:
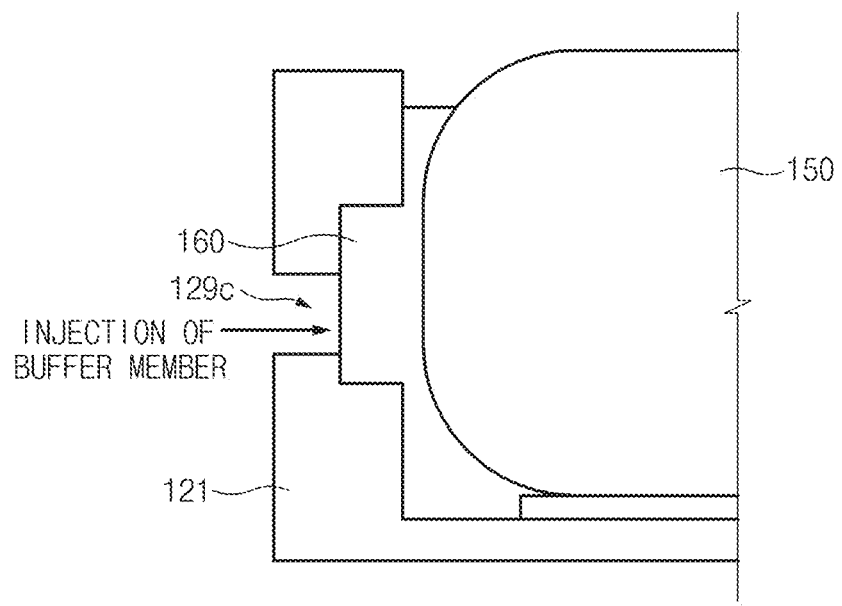

FIGS. 5A, 5B, and 5C are views illustrating injection passages of the buffer member according to various embodiments.

Referring to FIGS. 5A, 5B, and 5C, in an embodiment, the battery mounting part 121 may include a hole 129a, 129b, or 129c related to the injection of the buffer member 160 into the battery mounting part 121. The hole 129a, 129b, or 129c may be formed through at least a partial area of the battery mounting part 121 from an outer surface to an inner surface thereof. Accordingly, one area of the hole 129a, 129b, or 129c in the battery mounting part 121 may be exposed to the outside, and another area may be connected to the inside of the battery mounting part 121.

In an embodiment, the hole 129a, 129b, or 129c may be connected with the recess area 123, which is formed on the second surface (20 of FIG. 1) of the battery mounting part 121, while sharing at least a partial area with the recess area 123. Based on this structure, the buffer member 160 injected through the exposed area of the hole 129a, 129b, or 129c may flow along the hole 129a, 129b, or 129c and may reach at least a portion of the recess area 123.

In an embodiment, the shape of the hole 129a, 129b, or 129c may include at least one of a cylindrical shape 129a extending downward from an upper end of the second surface 20 of the battery mounting part 121 along the second surface 20, a prismatic shape 129b formed by cutting one area of an upper edge of the second surface 20, or a cylindrical shape 129c extending from the outer side of the second surface 20 to the inner side thereof. However, the shape of the hole 129a, 129b, or 129c is not limited thereto and may be implemented in various shapes that are connected to the recess area 123 through at least a partial area of the battery mounting part 121.

Figure 6A:
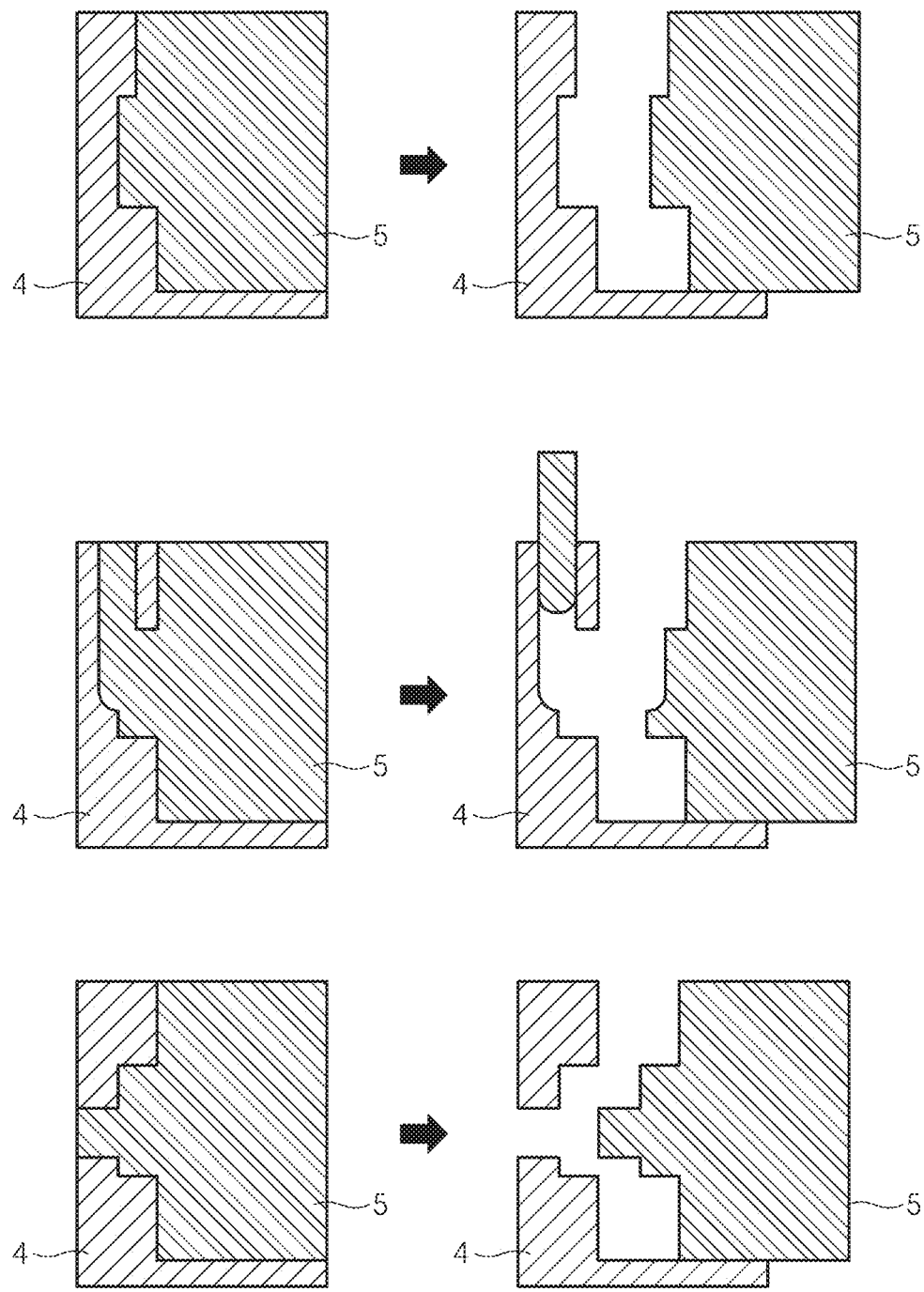
FIG. 6A is a view illustrating a manufacturing process of the battery mounting part according to an embodiment.
Figure 6C:
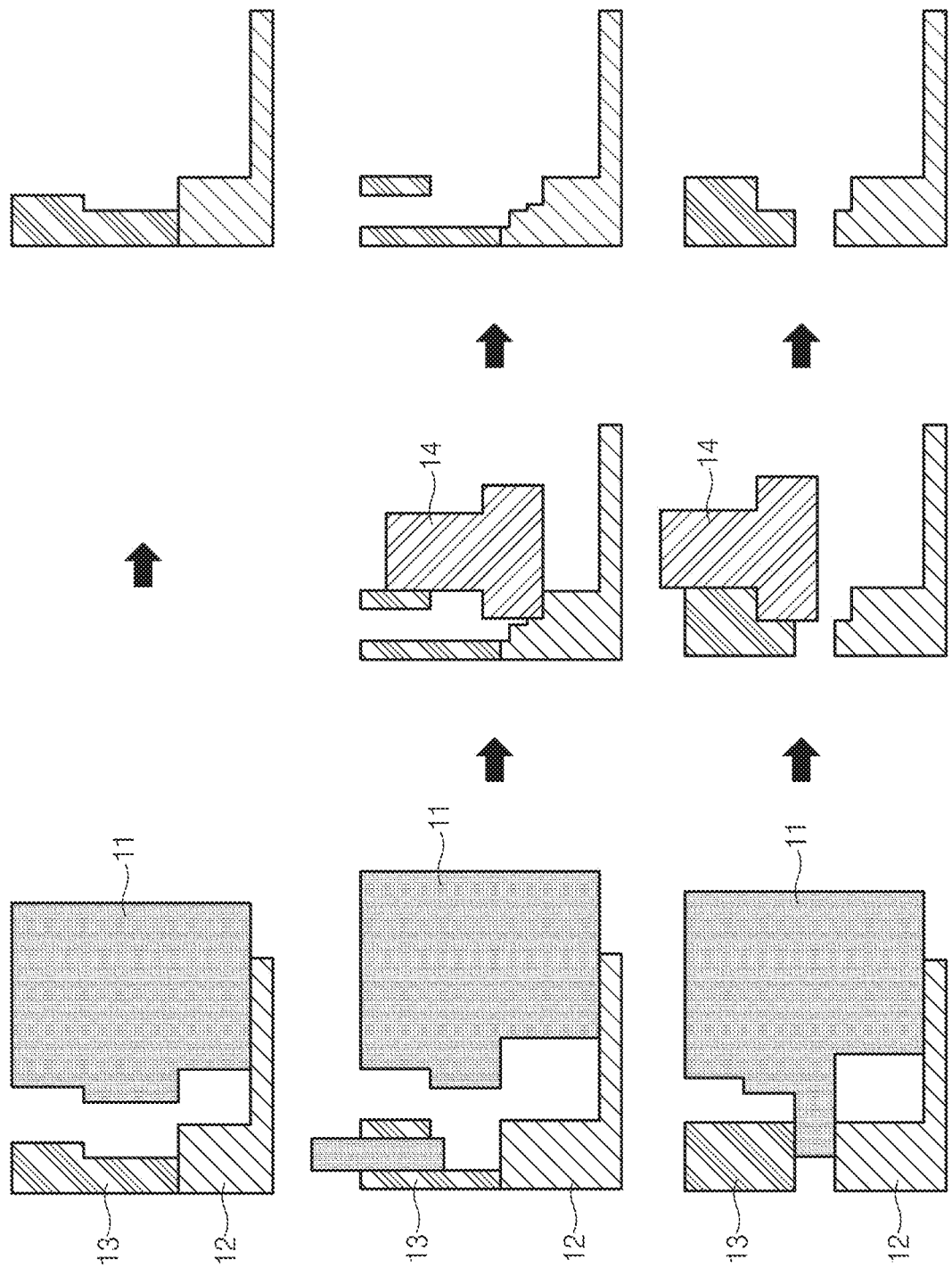
FIG. 6C is a view illustrating a manufacturing process of the battery mounting part according to another embodiment.

FIGS. 6A, 6B, and 6C are views illustrating manufacturing processes of the battery mounting part according to various embodiments.

According to various embodiments, the battery mounting part (121 of FIG. 1) may be manufactured based on at least one of a polymer compound (e.g., plastic), metal, or a mixture of the polymer compound and the metal. The manufacturing process of the battery mounting part 121 may include a manufacturing process for at least one of the recess area (123 of FIG. 3A), the sub-recess area (127a of FIG. 4A or 127b of FIG. 4B), or the hole (129a of FIG. 5A, 129b of FIG. 5B, or 129c of FIG. 5C), which is included or formed as one area of the battery mounting part 121.

Referring to FIG. 6A, the battery mounting part 121 may be molded through a series of processes of injecting a polymer compound 4 heated and melted in a cylinder into a mold 5 in a specified shape and thereafter separating the mold 5 from the cured polymer compound 4.

Alternatively, as illustrated in FIG. 6B, the battery mounting part 121 may be shaped through a process of cutting metal 6 with a specified machine tool or tool 7 or cutting metal 8, which has a hole area formed therein based on a drilling process, with a machine tool or tool 9.

In another case, referring to FIG. 6C, the battery mounting part 121 may be molded through a process of cutting metal 12 such that the metal 12 corresponds to the shape of at least one area of a specified mold 11, injecting a heated and melted polymer compound 13 into a combined body of the mold 11 and the metal 12, and separating the mold 11. In addition, a process of cutting the molded part, from which the mold 11 is separated, by using a machine tool or tool 14 according to the shape of the battery mounting part 121 to be shaped may be involved.

Figure 7A:
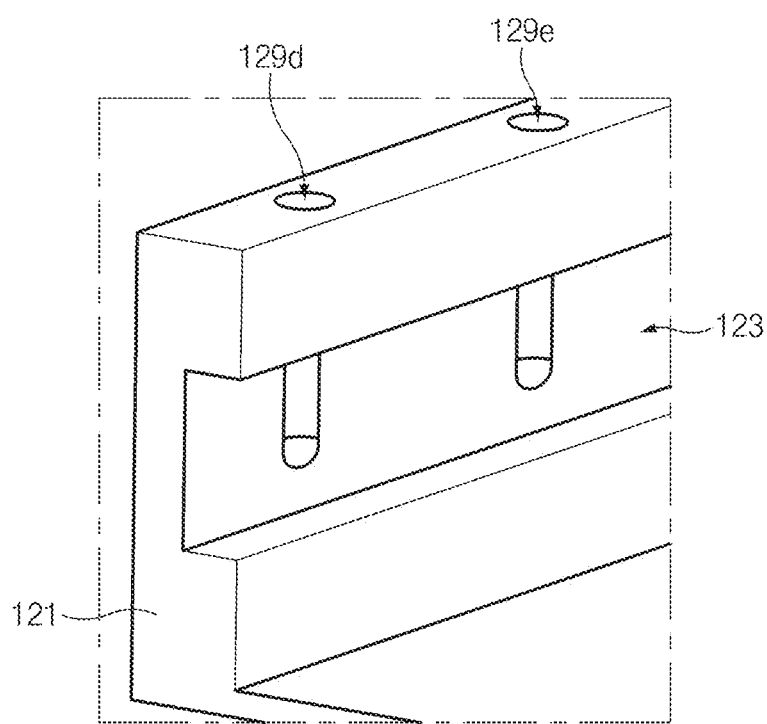
FIG. 7A is a view illustrating a hole according to an embodiment.
Figure 7B:
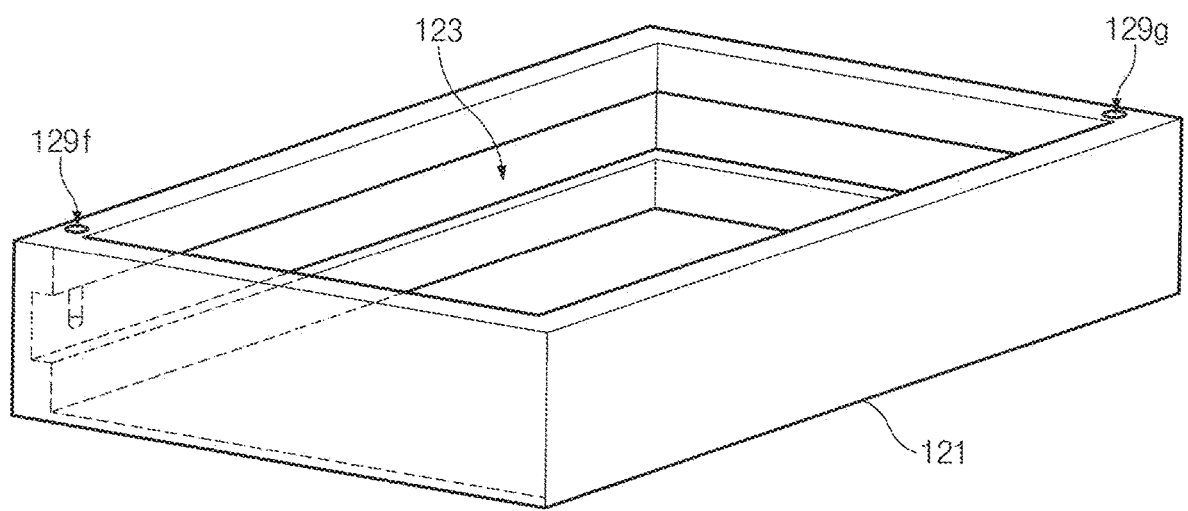
FIG. 7B is a view illustrating a hole according to another embodiment.

FIGS. 7A and 7B are views illustrating holes according to various embodiments. In FIGS. 7A and 7B, the holes may be understood as the hole (129a of FIG. 5A) that has the shape mentioned above with reference to FIG. 5A, and matters that will be described below may be identically or similarly applied to the hole (129b of FIG. 5B or 129c of FIG. 5C) that has a different shape.

Referring to FIG. 7A, in an embodiment, the battery mounting part 121 may include a plurality of aforementioned holes. For example, the battery mounting part 121 may include a plurality of holes (a first hole 129d and a second hole 129e) that are formed in at least one second surface (20 of FIG. 1) with a specified space therebetween. The plurality of holes 129d and 129e may be formed in the same or corresponding shapes and sizes.

In an embodiment, each of the plurality of holes 129d and 129e may function as an injection passage of the buffer member (160 of FIG. 2) that is injected into the spacing space between the battery mounting part 121 and the battery (150 of FIG. 1). The buffer member 160 injected through the holes 129d and 129e may be introduced into the recess area 123 along the slopes of the holes 129d and 129e, based the force of gravity or pressure exerted by a separate injection apparatus. For example, the buffer member 160 may be introduced into the recess area 123 from distal end areas of the holes 129d and 129e connected with the recess area 123, while flowing in left and right directions with respect to the holes 129d and 129e. Alternatively, any one of the plurality of holes 129d and 129e may function as an injection passage of the buffer member 160, and the other hole may be used as a means for determining the filling reliability of the buffer member 160. For example, the buffer member 160 injected through the first hole 129d may fill the spacing space between the battery mounting part 121 and the battery 150, and when the spacing space is saturated, the buffer member 160 may fill the second hole 129e and may overflow an exposed area of the second hole 129e or may be visible to the naked eyes. Accordingly, whether the spacing space is densely filled with the buffer member 160 may be verified by identifying the overflow of the buffer member 160, or viewing the buffer member 160, through the second hole 129e.

Referring to FIG. 7B, the battery mounting part 121 may include a plurality of holes 129f and 129g formed in the second surface 20 to face each other. Identically or correspondingly to those described above, any one (e.g., 129f) of the plurality of holes 129f and 129g may function as an injection passage of the buffer member 160, and the other hole (e.g., 129g) may function as a filling verification means based on overflow or visual identification of the buffer member 160.

Figure 7C:
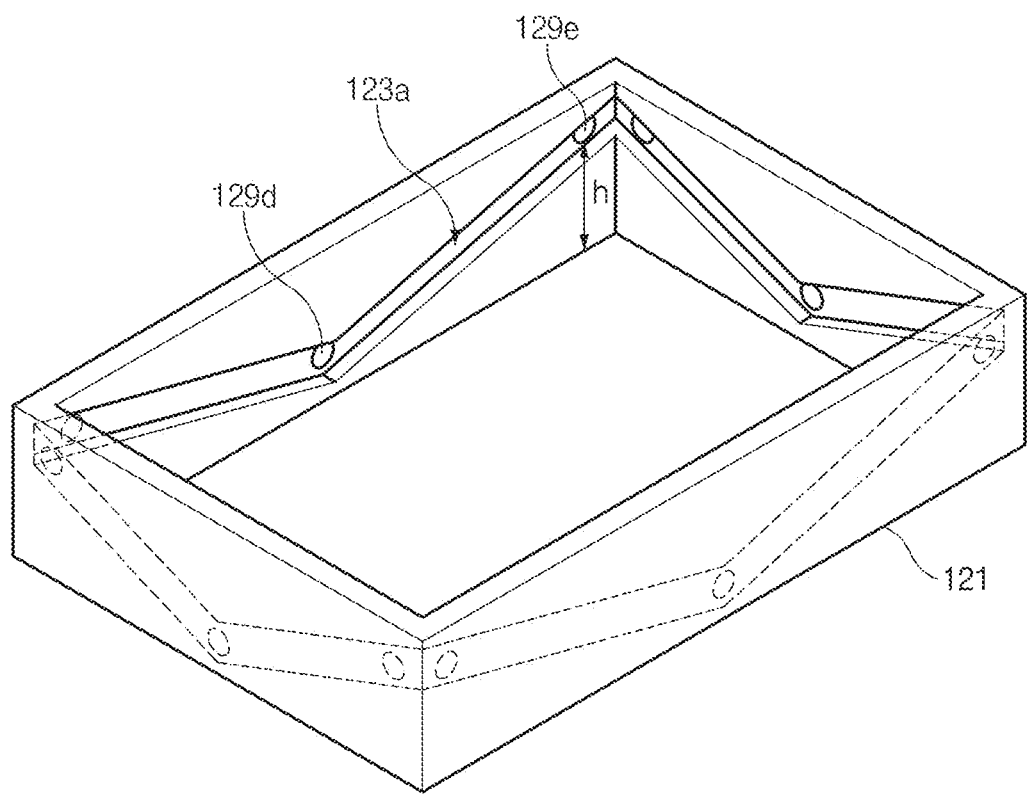
FIG. 7C is a view illustrating a battery mounting part according to another embodiment.
Figure 7D:
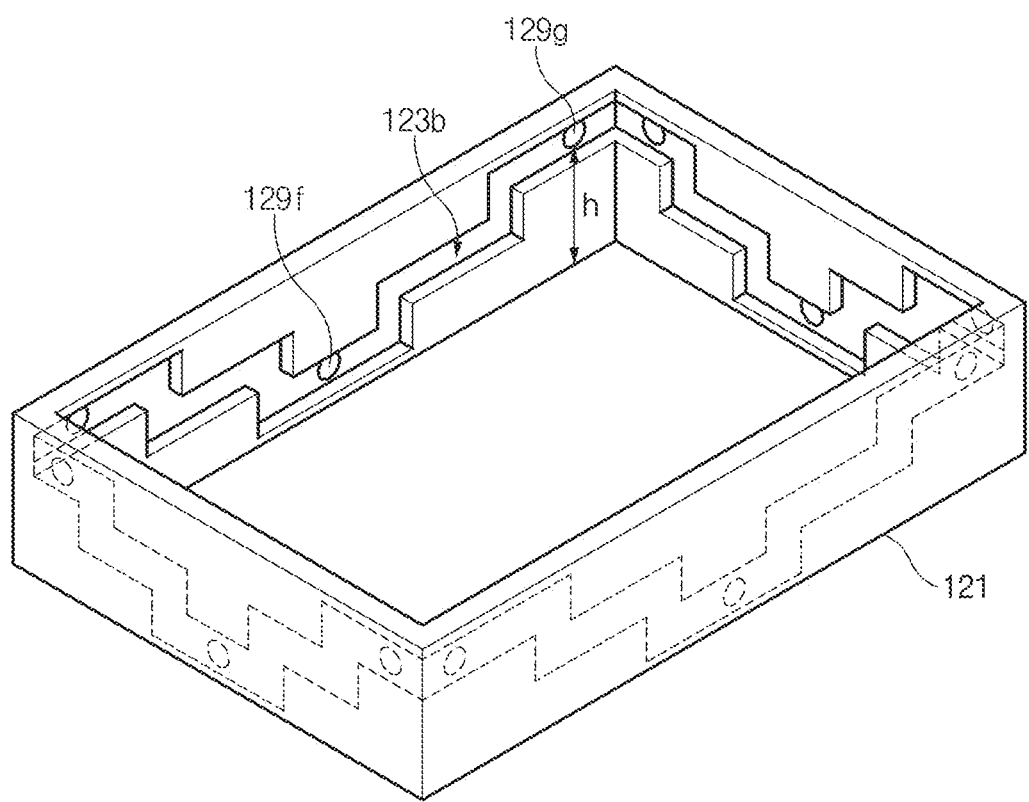
FIG. 7D is a view illustrating a battery mounting part according to another embodiment.

FIGS. 7C and 7D are views illustrating battery mounting parts according to various embodiments.

In various embodiments, at least one recess area formed on a second surface of a battery mounting part may be implemented in various shapes other than the above-described longitudinal shape (e.g., 123 of FIG. 3A) in connection with the determination of filling reliability of a buffer member. For example, based on a function (e.g., an injection passage function for the buffer member or a filling verification function for the buffer member) of at least one hole formed in the battery mounting part, the recess area may be implemented in a shape associated with an arrangement of the at least one hole.

Referring to FIG. 7C, in an embodiment, a recess area 123a that is concavely formed from the inner side to the outer side of a second surface (20 of FIG. 1) of a battery mounting part 121 may extend along the second surface 20 while forming a slope with a specified inclination. The recess area 123a may include a bent area where the direction of the slope is varied, and the slope may symmetrically extend with respect to the bent area. In an embodiment, the bent area and a distal end area of the slope extending with respect to the bent area may be connected with at least one hole 129d and 129e formed in the second surface 20 of the battery mounting part 121. In this regard, the first hole 129d of the at least one hole 129d and 129e that corresponds to the bent area may function as an injection passage of a buffer member (160 of FIG. 2). In this case, the buffer member 160 injected through the first hole 129d may flow in the bent area for a predetermined period of time and may flow onto a first surface (10 of FIG. 1) of the battery mounting part 121 to fill the inner space of the battery mounting part 121. When the buffer member 160 is injected to a specified height h or more, the above-described overflow may occur in the second hole 129e corresponding to the distal end area of the slope, or the buffer member 160 may be visually identified through the second hole 129e. Accordingly, whether the buffer member 160 densely fills the battery mounting part 121, in which the battery (150 of FIG. 1) is mounted, may be verified based on the overflow or the visual identification.

Referring to FIG. 7D, in another embodiment, a recess area 123b formed on a second surface (20 of FIG. 1) of a battery mounting part 121 may be implemented in a shape (or, a cascade shape) that symmetrically extends from a reference area and has multiple steps of a specified size. Because the recess area 123b is formed to have the multiple steps as described above, a contact surface of a buffer member 160 injected into the battery mounting part 121 may be increased, which may result in an improvement in the external impact absorption efficiency of the buffer member 160 (e.g., a cured buffer member) and an improvement in the attachment force of the buffer member 160 on the battery mounting part 121. Identically or correspondingly to those described above with reference to FIG. 7C, the reference area and a distal end area of the multiple steps may be connected with at least one hole 129f and 129g formed in the second surface 20 of the battery mounting part 121. The first hole 129f of the at least one hole 129f and 129g that corresponds to the reference area may function as an injection passage of the buffer member 160, and the second hole 129g corresponding to the distal end area of the multiple steps may function as a filling verification means for the buffer member 160 injected to a specified height h or more.

Figure 7E:
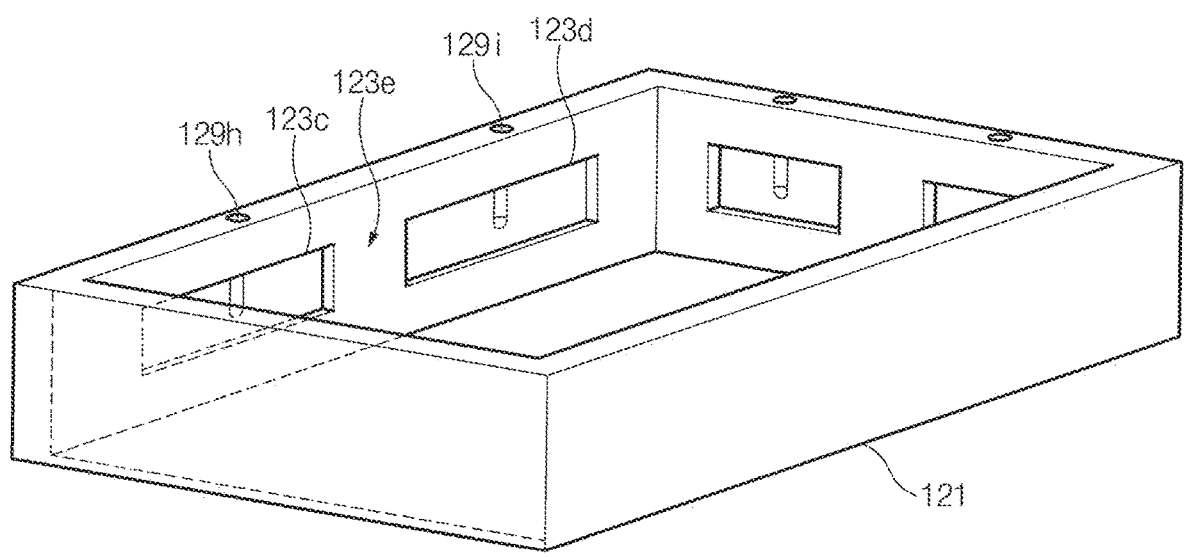
FIG. 7E is a view illustrating a battery mounting part according to another embodiment.
Figure 7F:
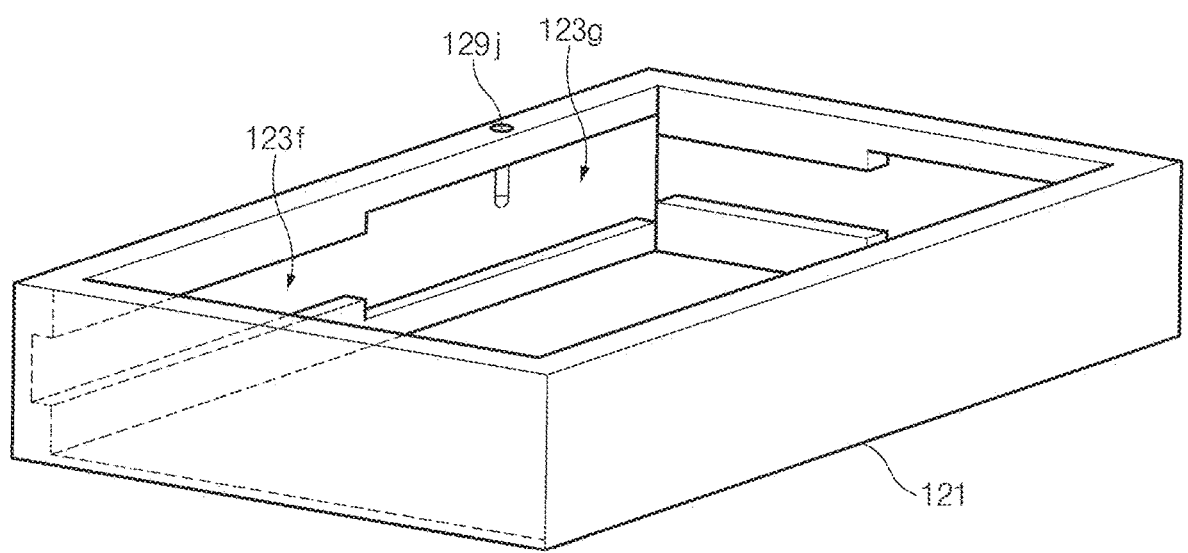
FIG. 7F is a view illustrating a battery mounting part according to another embodiment.

FIGS. 7E and 7F are views illustrating battery mounting parts according to various embodiments.

In various embodiments, a plurality of recess areas may be formed on at least one second surface (20 of FIG. 1) of a battery mounting part. For example, referring to FIG. 7E, the plurality of recess areas may include a first recess area 123c and a second recess area 123d that are formed on the second surface 20 of the battery mounting part 121 with a specified space therebetween. At least partial areas of the first recess area 123c and the second recess area 123d may be connected with a plurality of holes 129h and 129i formed in at least one area of the second surface 20. Alternatively, the hole 129h or 129i may be connected to any one of the first recess area 123c or the second recess area 123d. For example, when the hole 129h is connected to the first recess area 123c, a buffer member 160 may be injected into at least a partial area of the first recess area 123c through the first hole 129h, and at least a partial area of the second recess area 123d may be formed to be an air gap area (e.g., an area containing air) from which the buffer member 160 is excluded. The second recess area 123d including the gap area may not be physically connected with the first recess area 123c filled with the buffer member 160.

In an embodiment, a spacing area between the first recess area 123c and the second recess area 123d may be referred to as a non-recess area 123e where no recess is formed. For example, at least a portion of the non-recess area 123e may be formed to be a curved surface that is bent in a first direction from the inner side to the outer side of the second surface 20 of the battery mounting part 121 or in a second direction from the outer side to the inner side of the second surface 20.

In an embodiment, the first recess area 123c and the second recess area 123d may be formed on the second surface 20 of the battery mounting part 121 so as to be located at the same height or different heights with respect to a first surface (10 of FIG. 1) (e.g., a base). In another embodiment, the depths, sizes, or widths of the first recess area 123c and the second recess area 123d that are concavely formed on the second surface 20 of the battery mounting part 121 may be the same as, or different from, each other.

Referring to FIG. 7F, a recess area formed on at least one second surface (20 of FIG. 1) of a battery mounting part 121 may extend on the second surface 20 in the lengthwise direction and may have a varying width. For example, a first recess area 123f with a first width that extends in the lengthwise direction may be changed to a second recess area 123g with a second width (e.g., a width greater than the first width), at a specified point on the second surface 20. In an embodiment, at least a partial area of the second recess area 123g formed to have a relatively large width may be connected with a hole 129j formed in the second surface 20. Accordingly, a buffer member (160 of FIG. 2) that is injected through the hole 129j may be firstly introduced into the second recess area 113g and thereafter introduced into a spacing space between the battery mounting part 121 and a battery (150 of FIG. 1) or the first recess area 123f according to the amount of the buffer member introduced (or, injected).

Figure 8A:
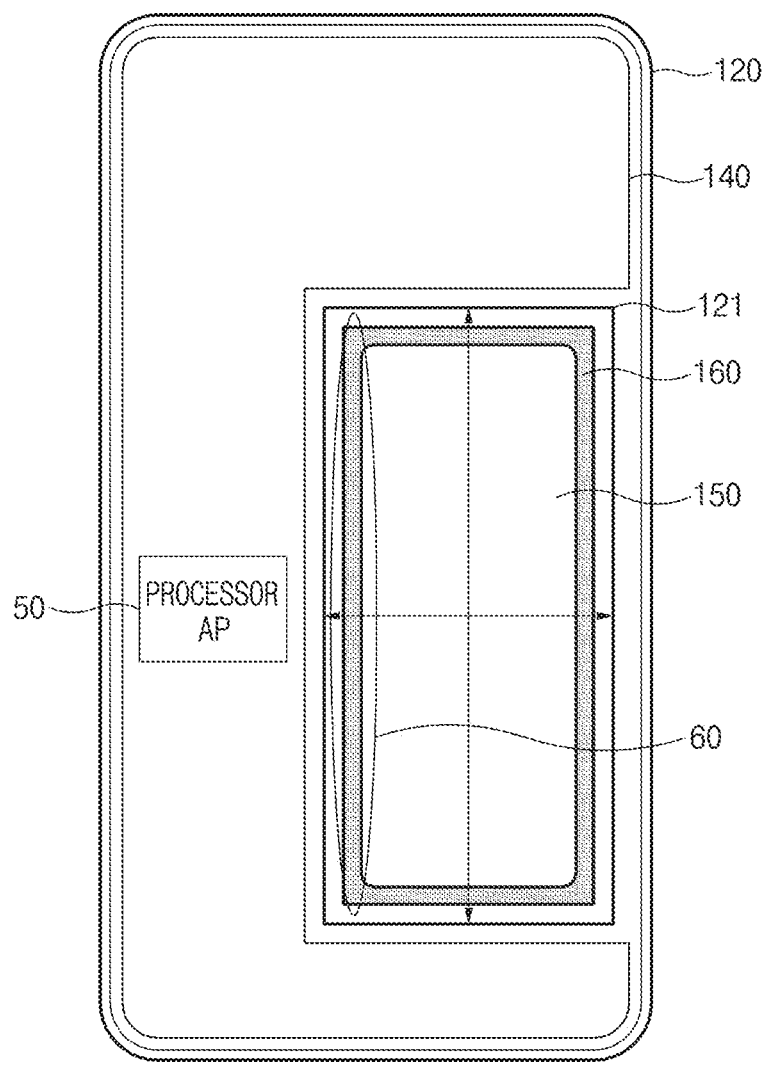
FIG. 8A is a view illustrating an arrangement of some components of the electronic device according to an embodiment.

FIG. 8A is a view illustrating an arrangement of some components of the electronic device according to an embodiment.

Referring to FIG. 8A, in regard to an arrangement structure for the components of the electronic device 100, the printed circuit board 140 may be disposed around the battery mounting part 121 in which the battery 150 is mounted on the second case 120 (e.g., the front case). As described above with reference to FIG. 1, electronic parts such as a memory, a processor, various types of modules, or the like that generate heat when driven may be mounted on the printed circuit board 140. The heat generated by the electronic parts may be conducted to, for example, the adjacent battery 150, which may lead to deterioration in the stability of the battery 150.

In this regard, in an embodiment, at least a portion of the buffer member 160 filling the spacing space between the battery mounting part 121 and the battery 150 may include a material having a heat insulation property. For example, the buffer member 160 over the entire area of the spacing space may include a material having a heat insulation property, or the buffer member 160 filling an area 60 adjacent to a mounting area 50 of an electronic part (e.g., an application processor (AP), or the like) that functions as a main heat source may include a material having a heat insulation property.

In an embodiment, at least a portion of the area 60 adjacent to the mounting area 50 of the electronic part may not be filled with the buffer member 160. In this regard, the area not filled with the buffer member 160 may be implemented to be, for example, an area containing air (e.g., an air gap). The area containing air may block heat radiated toward the battery 150 from the heat source (e.g., a processor).

Figure 8B:
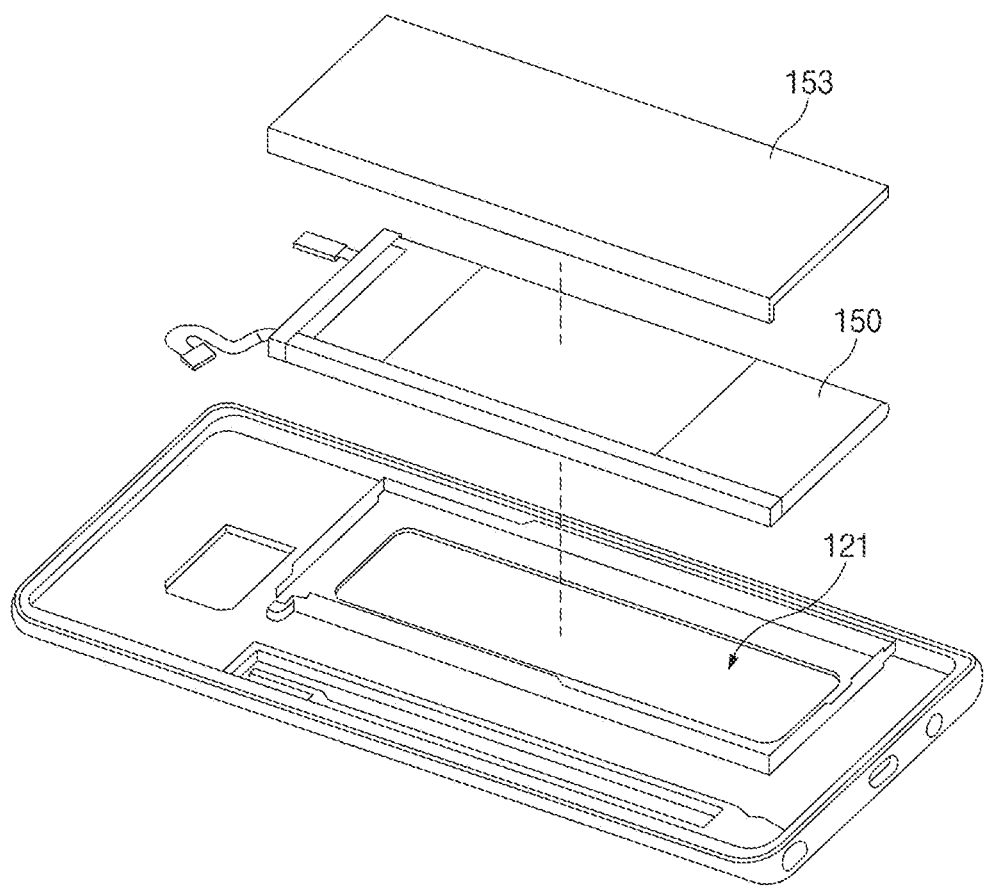
FIG. 8B is a view illustrating an arrangement of a jig member according to an embodiment.
Figure 8C:
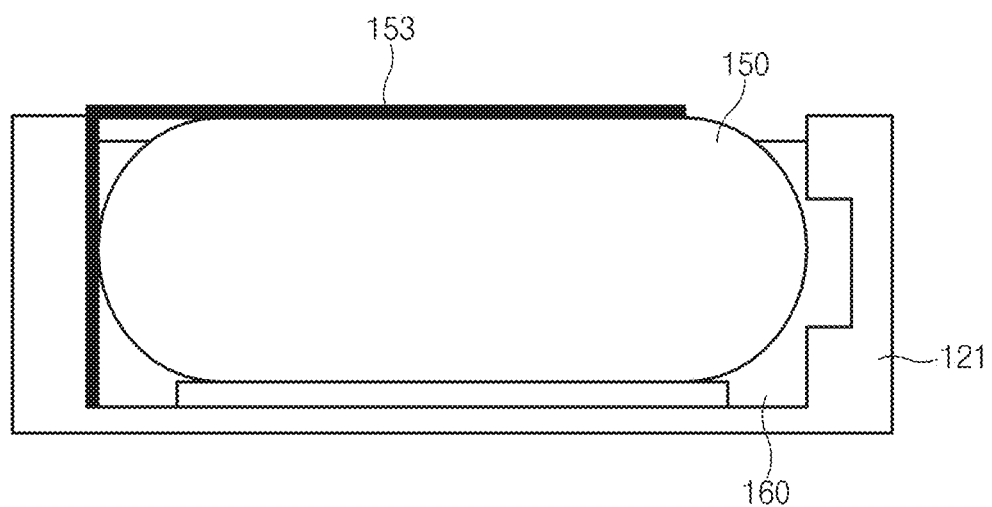
FIG. 8C is a sectional view of a battery mounting structure according to another embodiment that is taken in one direction.

FIG. 8B is a view illustrating an arrangement of a jig member according to an embodiment, and FIG. 8C is a sectional view of a battery mounting structure according to another embodiment that is taken in one direction (e.g., the direction B-B' of FIG. 8A).

Referring to FIGS. 8B and 8C, in an embodiment, in regard to the prevention of heat conduction to the battery 150 that has been described above, the spacing space between the battery mounting part 121 and the battery 150 may include at least one of a first area in which the buffer member 160 (e.g., a cured buffer member) is located or a second area including air rather than the buffer member 160. In regard to the implementation of the second area, a jig member 153 functioning as masking may be coupled to one side surface of the battery 150 during an injection process of the buffer member 160. The battery 150 may be integrated with the jig member 153 and mounted in the battery mounting part 121, and the buffer member 160 injected into the battery mounting part 121 may fill an area where the jig member 153 is excluded. After the buffer member 160 is cured, the jig member 153 may be separated from the battery 150 to implement the second area containing air. The second area may prevent heat generated from a specific component of the electronic device 100 from being conducted to the battery 150, thereby supporting stable operation of the battery 150. In an embodiment, the jig member 153 may include at least one sidewall coupled or adjacent to the one side surface of the battery 150, and in regard to the implementation of the second area, the sidewall of the jig member 153 may be implemented in various shapes.

The above-described electronic device according to various embodiments (or, an electronic device) may include a battery and a battery mounting part that receives the battery therein.

According to various embodiments, the battery mounting part may include a base and at least one side surface extending from an edge of the base, and a recess area may be formed in at least a partial area of the at least one side surface.

According to various embodiments, the electronic device may further include a housing.

According to various embodiments, the battery mounting part may be formed to be at least a portion of the housing of the electronic device.

According to various embodiments, the battery mounting part may be coupled to the housing.

According to various embodiments, the recess area may extend in a lengthwise direction of the at least one side surface.

According to various embodiments, the recess area may include a first recess area and a second recess area that are formed in a first side surface of the at least one side surface.

According to various embodiments, the first recess area may have a first size, a first depth, a first shape, or a first surface property, and the second recess area may have a second size, a second depth, a second shape, or a second surface property.

According to various embodiments, a non-recess area may be formed between the first recess area and the second recess area.

According to various embodiments, at least a partial area of the non-recess area may be formed to be a curved surface.

According to various embodiments, the recess area may have an inclination that is symmetrical with respect to one area of the at least one side surface.

According to various embodiments, the recess area may be formed in a cascade shape.

According to various embodiments, a gap-filler may be disposed in at least one space between the battery mounting part and the battery.

According to various embodiments, the battery mounting part may include at least one hole formed through the at least one side surface from an outer side to an inner side of the at least one side surface and connected with the recess area.

According to various embodiments, the at least one hole may include at least one of a first hole formed in a first area of the at least one side surface and a second hole formed in a second area different from the first area of the at least one side surface.

According to various embodiments, the battery mounting part may include another recess area formed in a higher position than the recess area.

According to various embodiments, the gap-filler may be disposed in at least a partial area of the recess area.

According to various embodiments, the gap-filler may include at least one of a first area having a first viscosity or a second area having a second viscosity different from the first viscosity.

According to various embodiments, the gap-filler may not be disposed in at least one space between the battery mounting part and the battery.

The above-described electronic device according to various embodiments (or, an electronic device) may include a housing having a battery mounting part formed thereon and a battery mounted in the battery mounting part.

According to various embodiments, the battery mounting part may include a base and at least one side surface extending from an edge of the base, and a recess area may be formed in at least a partial area of the at least one side surface.

According to various embodiments, a gap-filler may be disposed in at least a partial area of the recess area.

According to various embodiments, the gap-filler may not be disposed in at least one space between the battery mounting part and the battery.

The above-described electronic device according to various embodiments (or, an electronic device) may include a battery and a battery mounting part that includes a first surface and at least one second surface extending from an edge of the first surface at a specified angle and that receives the battery therein.

According to various embodiments, at least a portion of the second surface of the battery mounting part may include a recess area that is concavely formed to a specified depth in at least a partial area of an inner side.

According to various embodiments, the recess area may include a shape that extends a specified distance along a lengthwise direction of the second surface of the battery mounting part.

According to various embodiments, the recess area may include a shape that has an inclination symmetrical with respect to one area of the second surface of the battery mounting part and that extends a specified distance.

According to various embodiments, the recess area may include a shape that forms multiple steps symmetrical with respect to one area of the second surface of the battery mounting part and that extends a specified distance.

According to various embodiments, based on the height of a central portion of the battery disposed in one area inside the battery mounting part, the recess area may be formed in any one of a first position on the second surface of the battery mounting part that corresponds to the height of the central portion, a second position higher than the height of the central portion, and a third position lower than the height of the central portion.

According to various embodiments, the recess area may be formed on any one of the at least one second surface and may be continuous with adjacent another second surface while extending in the lengthwise direction of the second surface.

According to various embodiments, the recess area may include a specified inclination.

According to various embodiments, the electronic device may further include a buffer member that fills at least one space between the battery mounting part and the battery.

According to various embodiments, the battery mounting part may include, in at least a portion of the second surface, at least one hole supporting injection of the buffer member.

According to various embodiments, the battery mounting part may include, on at least a portion of the second surface, a sub-recess area that prevents an escape of the buffer member.

According to various embodiments, at least a partial area of the buffer member may include an elastic property in a specified range.

According to various embodiments, at least a partial area of the buffer member may include a heat insulation property.

According to various embodiments, the buffer member may fill at least a partial area of the recess area.

According to various embodiments, the buffer member may include at least one of a first buffer member having a viscosity in a first range and a second buffer member having a viscosity in a second range different from the first range. The first buffer member may fill at least a portion of a specified first area of the recess area, and the first buffer member or the second buffer member may fill at least a portion of a specified second area of the recess area.

According to various embodiments, the buffer member may include a third buffer member in which a first buffer member having a viscosity in a first range and a second buffer member having a viscosity in a second range different from the first range are mixed at a specified ratio.

According to various embodiments, at least a partial area of the hole may be connected with at least a partial area of the recess area.

According to various embodiments, the hole may include at least one of a first hole functioning as an injection passage of the buffer member and a second hole in which overflow of the buffer member occurs.

According to various embodiments, at least a partial area of the hole may include a specified inclination.

According to various embodiments, the at least one space between the battery mounting part and the battery may include an air space.

Each of the components described herein may include one or more components, and the name of the corresponding component may be varied according to the type of the electronic device. In various embodiments, the electronic device may include at least one of the components described herein, and may not include some of the components or may further include other additional components. Furthermore, some of the components of the electronic device according to various embodiments may be combined with each other to form one entity and may identically perform the functions of the corresponding components before the combination.

The embodiments disclosed herein are provided to easily describe technical details of the disclosure and to help the understanding of the disclosure, and are not intended to limit the scope of the disclosure. Therefore, it should be construed that all modifications and changes or various other embodiments based on the technical idea of the disclosure fall within the scope of the disclosure.

The invention claimed is:

1. An electronic device comprising:
   a battery; and
   a battery mounting part,
   wherein the battery mounting part is configured to receive the battery therein, and includes a base, four side surfaces extending from an edge of the base, and recess areas formed in each of the four side surfaces,
   wherein the battery mounting part includes three holes formed on each of the four side surfaces,
   wherein a gap-filler configured to prevent a movement of the battery is disposed in at least one space between the battery mounting part and the battery,
   wherein the recess areas include a first recess area formed in a first side surface of the four side surfaces, a second recess area formed in a second side surface of the four side surfaces, a third recess area formed in a third side surface of the four side surfaces, and a fourth recess area formed in a fourth side surface of the four side surfaces,
   wherein the first recess area includes two distal end areas and one middle area where a first hole and a second hole of the three holes are each formed in a first distal end area and a second distal end area of the two distal end areas, and a third hole of the three holes is formed in the one middle area,
   wherein the second recess area includes two distal end areas and one middle area where a first hole and a second hole of the three holes are each formed in a first distal end area and a second distal end area of the two distal end areas, and a third hole of the three holes is formed in the one middle area,
   wherein the third recess area includes two distal end areas and one middle area where a first hole and a second hole of the three holes are each formed in a first distal end area and a second distal end area of the two distal end areas, and a third hole of the three holes is formed in the one middle area,
   wherein the fourth recess area includes two distal end areas and one middle area where a first hole and a second hole of the three holes are each formed in a first distal end area and a second distal end area of the two distal end areas, and a third hole of the three holes is formed in the one middle area,
   wherein a height of each of the two distal end areas of the first recess area from the base is higher than a height of the one middle area of the first recess area from the base,
   wherein the first distal end area of the two distal end areas of the first recess area is extended from the second recess area, and the second distal end area of the two distal end areas of the first recess area is extended from the third recess area, and
   wherein the first side surface is extended from each of the second side surface and the third side surface.

2. The electronic device of claim 1, further comprising:
   a housing,
   wherein the battery mounting part is formed to be at least a portion of the housing of the electronic device.

3. The electronic device of claim 1, wherein the first recess area has an inclination that is symmetrical with respect to an axis formed in a height direction in a center of the first side surface.

4. The electronic device of claim 1, wherein the first recess area is formed in a cascade shape.

5. The electronic device of claim 1, wherein the gap-filler is disposed in at least a partial area of the first recess area.

6. The electronic device of claim 1, wherein the gap-filler is not disposed in at least one space between the battery mounting part and the battery.

\* \* \* \* \*